US009618208B2

(12) United States Patent
Hobbs et al.

(10) Patent No.: US 9,618,208 B2
(45) Date of Patent: Apr. 11, 2017

(54) LEAN AZIMUTHAL FLAME COMBUSTOR

(71) Applicant: INDUSTRIAL TURBINE COMPANY (UK) LIMITED

(72) Inventors: Joseph L. Hobbs, Faversham (GB); Jennifer A. M. Sidey, Cambridge (GB); Robert L. Gordon, Montreal (CA); Epaminondas Mastorakos, Cambridge (GB); Gilles Bourque, Lery (CA)

(73) Assignee: INDUSTRIAL TURBINE COMPANY (UK) LIMITED (GB)

( * ) Notice: Subject to any disclaimer, the term of this patent is extended or adjusted under 35 U.S.C. 154(b) by 366 days.

(21) Appl. No.: 14/143,589

(22) Filed: Dec. 30, 2013

(65) Prior Publication Data

US 2014/0260305 A1     Sep. 18, 2014

Related U.S. Application Data

(60) Provisional application No. 61/780,835, filed on Mar. 13, 2013.

(51) Int. Cl.
*F23R 3/12*     (2006.01)
*F23R 3/34*     (2006.01)
(Continued)

(52) U.S. Cl.
CPC ............... *F23R 3/12* (2013.01); *F23C 7/002* (2013.01); *F23C 7/02* (2013.01); *F23C 9/006* (2013.01);
(Continued)

(58) Field of Classification Search
CPC .... F02C 1/08; F02C 3/34; F23C 7/002; F23C 2202/40; F23R 3/04; F23R 3/12; F23R 3/58; F23R 2900/00015; F23R 2900/03282
See application file for complete search history.

(56) References Cited

U.S. PATENT DOCUMENTS 2,257,982 A    10/1941    Seippel
4,211,073 A    7/1980     Guillot
(Continued)

FOREIGN PATENT DOCUMENTS

CN    102460015 A    5/2012
CN    102797565 A    11/2012
(Continued)

OTHER PUBLICATIONS

International Search Report for PCT/US2013/066483 mailed Feb. 19, 2014.

*Primary Examiner* — Gerald L Sung
*Assistant Examiner* — Scott Walthour
(74) *Attorney, Agent, or Firm* — Beusse Wolter Sanks & Maire

(57) ABSTRACT

A combustion chamber may include a first surface and a second surface interconnected by a wall forming a chamber having a central axis. The first surface may define an exhaust opening and the second surface defining a pilot opening, wherein the exhaust opening and the pilot opening align along the central axis. A plurality of inlet ports may be configured to deliver air to the chamber. A plurality of fuel ports may be arranged on an inside of the second surface to deliver fuel to the chamber. The air flow from the inlet ports and fuel from the fuel ports may oppose each other to create a vortex of product proximal to the second surface.

19 Claims, 6 Drawing Sheets

(51) Int. Cl.
  F23C 7/00 (2006.01)
  F23R 3/04 (2006.01)
  F23R 3/28 (2006.01)
  F23C 7/02 (2006.01)
  F23C 9/00 (2006.01)
  F23R 3/58 (2006.01)
  *F02C 1/08* (2006.01)
  *F02C 3/34* (2006.01)

(52) U.S. Cl.
  CPC ............... *F23R 3/04* (2013.01); *F23R 3/286* (2013.01); *F23R 3/343* (2013.01); *F23R 3/58* (2013.01); *F02C 1/08* (2013.01); *F02C 3/34* (2013.01); *F23C 2202/40* (2013.01); *F23R 2900/00015* (2013.01); *F23R 2900/03282* (2013.01)

(56) References Cited

U.S. PATENT DOCUMENTS

| | | | |
|---|---|---|---|
| 5,076,779 A | 12/1991 | Kobayashi | |
| 5,746,048 A * | 5/1998 | Shah | F23R 3/50 60/756 |
| 6,101,808 A | 8/2000 | Knuth et al. | |
| 6,209,325 B1 | 4/2001 | Alkabie | |
| 6,209,327 B1 | 4/2001 | Keller et al. | |
| 6,298,659 B1 | 10/2001 | Knuth et al. | |
| 6,601,380 B2 | 8/2003 | Knuth et al. | |
| 6,735,949 B1 * | 5/2004 | Haynes | F23R 3/283 60/746 |
| 6,826,912 B2 | 12/2004 | Levy et al. | |
| 6,865,878 B2 | 3/2005 | Knuth et al. | |
| 7,003,961 B2 | 2/2006 | Kendrick et al. | |
| 7,062,917 B2 | 6/2006 | Wunning et al. | |
| 7,127,897 B2 | 10/2006 | Carrea | |
| 7,305,831 B2 | 12/2007 | Carrea et al. | |
| 7,452,513 B2 | 11/2008 | Matveev | |
| 7,621,131 B2 | 11/2009 | Von Der Bank | |
| 2001/0026911 A1 * | 10/2001 | Neville | F23C 9/006 431/285 |
| 2002/0069648 A1 | 6/2002 | Levy et al. | |
| 2004/0154307 A1 | 8/2004 | Carrea | |
| 2004/0209129 A1 | 10/2004 | Carrea | |
| 2005/0074711 A1 * | 4/2005 | Cain | F23C 5/08 431/9 |
| 2005/0155351 A1 | 7/2005 | Wunning et al. | |
| 2007/0261408 A1 | 11/2007 | Carrea et al. | |
| 2008/0131823 A1 * | 6/2008 | Niass | F23C 3/008 431/8 |
| 2009/0249793 A1 | 10/2009 | Nilsson et al. | |
| 2009/0277178 A1 | 11/2009 | Carroni et al. | |
| 2010/0058732 A1 | 3/2010 | Kaufmann et al. | |
| 2010/0192583 A1 * | 8/2010 | Cano Wolff | F23C 9/006 60/737 |
| 2010/0286889 A1 | 11/2010 | Childers | |
| 2010/0287939 A1 | 11/2010 | Cornwell et al. | |
| 2011/0023492 A1 * | 2/2011 | Gupta | F02C 7/22 60/734 |

FOREIGN PATENT DOCUMENTS

| | | |
|---|---|---|
| DE | 102005008421 A1 | 8/2006 |
| EP | 2144000 A2 | 1/2010 |
| EP | 2407652 A1 | 1/2012 |
| GB | 2273316 A | 6/1994 |
| WO | WO-2006094896 A1 | 9/2006 |
| WO | 2010128964 A1 | 11/2010 |

* cited by examiner

US 9,618,208 B2

LEAN AZIMUTHAL FLAME COMBUSTOR

CROSS-REFERENCE TO RELATED APPLICATIONS

This application claims priority to U.S. Provisional Patent Application No. 61/780,835, filed Mar. 13, 2013, the contents of which are hereby incorporated in their entirety.

FIELD OF TECHNOLOGY

The present disclosure relates to an improved combustion chamber of a gas turbine engine.

BACKGROUND

Development for combustion of gas turbine engines may focus on reducing emissions and being able to burn a variety of fuel sources. Certain requirements for low emissions of nitrogen oxides (NOx) and carbon monoxide (CO) provide certain design constraints. Achieving low CO is generally linked with complete combustion and product gases being in thermodynamic equilibrium. Achieving low NOx is linked with low combustion temperatures and low residence times, which can be brought about through lean fuel-air ratios and/or dilution. Dilution of combustion gases may be achieved with exhaust gases, such as exhaust gas recirculation (EGR) and flue gas recirculation (FGR.) These conditions may result in incomplete combustion which in turn may lead to high CO output.

To prevent incomplete combustion, traditional combustion systems are sized with an appropriate volume. However, this approach and with high dilution (EGR or FGR) may be limited by flammability and temperature limits. Thus, a combustion chamber configured to result in combustion with ultra-low NOx and CO output is needed.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Described herein is a combustion chamber configured to create a vortex within the chamber by mixing air from the outlet end of the chamber with fuel injected at an inlet end of the chamber. Due to the manner at which the air enters the outlet end of the chamber, the product gases created by the reaction of mixing the air and fuel is partially trapped, forcing a portion of them to return to the inlet end. Further, azimuthal reactant jets may be spaced within the chamber to provide reactant. These jets may be reverse-flowing swirling jets that provide a bulk fluid motion so that the product gases at one jet provides the reactant for the next. That is, each reaction is supported by a stream of product gases from the previous reaction. The created swirl, however, may not be sufficient to induce vortex breakdown, but simply be enough to provide a conical flow path. The embodiments described herein provide for a lean azimuthal flame (LEAF) combustor to achieve stable, highly diluted combustion. In order to provide for this configuration, the air flow entering the chamber at the outlet end may create an azimuthal flow. That is, the air flow may angle such that the end of the air flow may be offset from the air holes, as is described herein.

Figure 1:
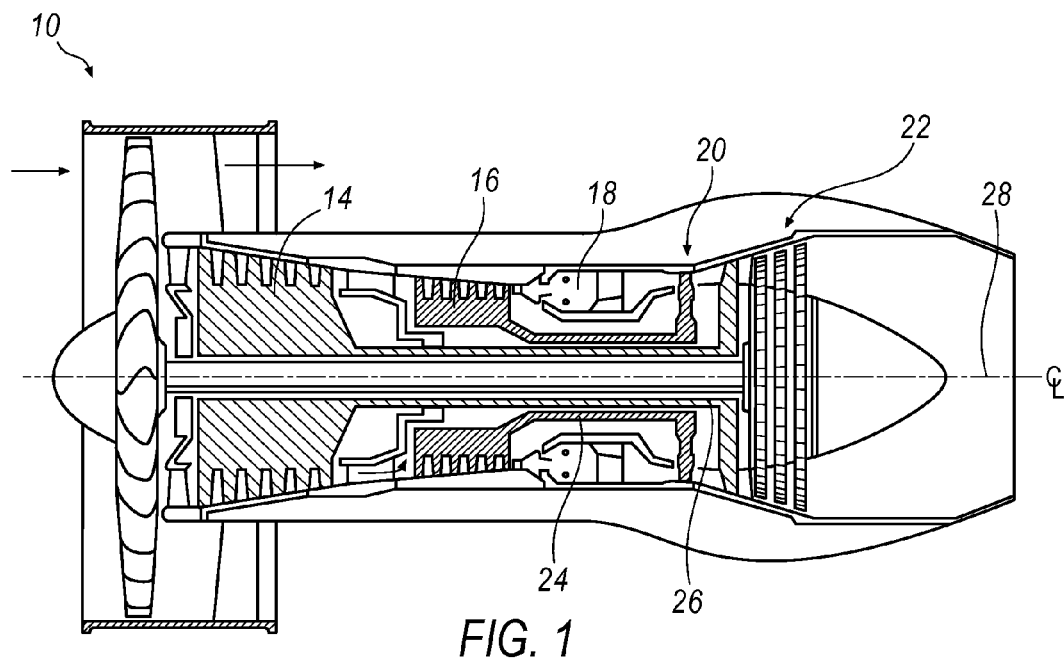
FIG. 1 illustrates a schematic view of a gas turbine engine employing the improvements discussed herein.

FIG. 1 illustrates a gas turbine engine 10 which may be configured to provide general power generation. The engine 10 may include a low pressure compressor, and intermediate compressor (not shown), and a high pressure compressor, 14 and 16, a combustor 18, and a high pressure turbine, an intermediate pressure turbine (not shown), and low pressure turbine, 20 and 22, respectively. The high pressure compressor 16 is connected to a first rotor shaft 24 while the low pressure compressor 14 is connected to a second rotor shaft 26. The intermediate compressor would be connected to the intermediate via a third rotor shaft. The shafts extend axially and are parallel to a longitudinal center line axis 28. The engine 10 includes an improved combustion chamber 18, which incorporates the improved features disclosed herein.

Figure 2:
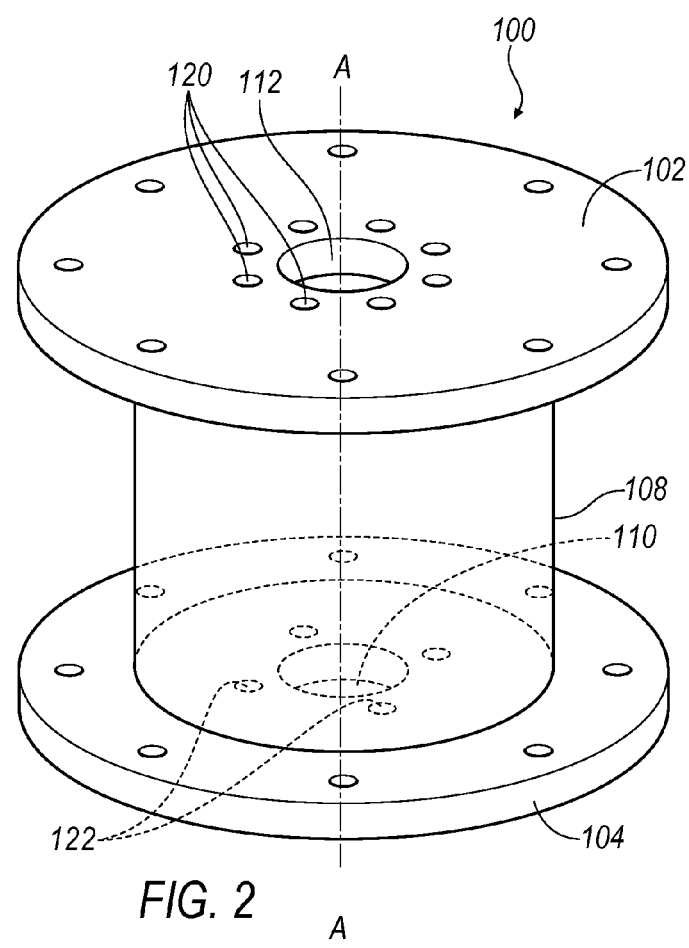
FIG. 2 illustrates a perspective view of an exemplary combustion chamber.

FIG. 2 illustrates a perspective view of an exemplary combustion chamber 100 of the combustor 18. The combustion chamber 100 may facilitate the combination of fuel and air for combustion in a jet fuel engine or an industrial gas turbine. The fuel may be gaseous, liquid or solid, or any combination thereof. Common examples of gaseous fuels may be any one or combination of natural gas (composed of, but not limited to, methane and or ethane and or propane and or butane, pentane (and or the isomer variants), hydrogen, carbon monoxide, carbon dioxide, nitrogen, water, etc., and/or Syngas (composed of, but not limited to hydrogen, and or carbon monoxide, methane, carbon dioxide, nitrogen, water, etc.). Examples of liquid fuels may be any one or combination of alcohol, kerosene, diesel, etc. An example of solid fuel may be pulverized coal. The air may be an oxidant and may include a number of compositions from a variety of sources. The fuel and air may be premixed, or it may not be. Within the chamber 100, the fuel and air may combine and react. These reactions may facilitate combustion. The combined fuel and air may be referred to herein as 'product gases.'

The combustion chamber 100 may have a first surface, referred to hereinafter as an outlet end 102, and a second surface, referred to hereinafter as an inlet end 104. The two ends 102, 104 may be circular or other geometric configuration and interconnected by a wall 108 forming a cylinder-like chamber 100. The inlet end 104 may define at least one inlet opening 110. The outlet end 102 may define at least one outlet opening 112 configured to allow exhaust products to exit the chamber 100. The exhaust may provide energy to a turbine (not shown). Each of the openings 110, 112 may be axially aligned along an axis A of the respective ends 102, 104.

Figure 4:
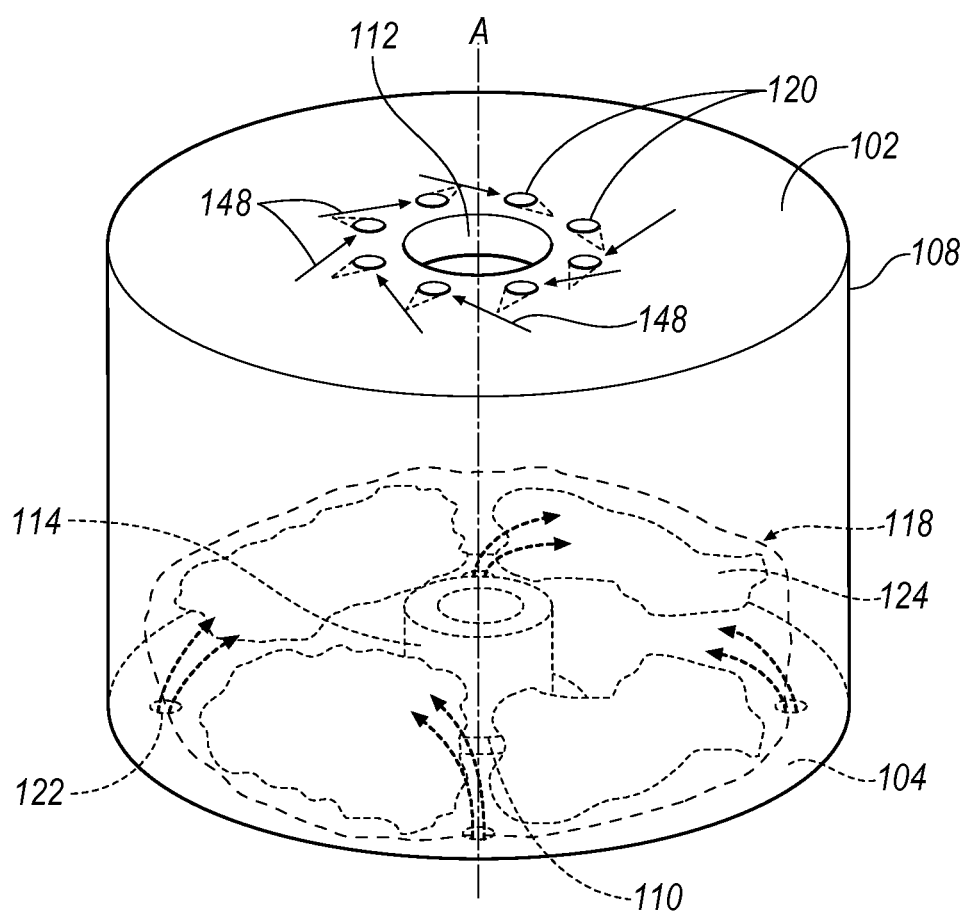
FIG. 4 illustrates a perspective view of the exemplary combustion chamber of FIG. 4 in operation.

The inlet opening 110 may be configured to receive a central injector 114 (as shown in FIG. 4.). The central injector 114 may be configured to deliver a central reaction zone to the chamber 100. The central reaction zone may maintain the stability of the combustion chamber 100. This may be done by providing a reaction for the chamber. A pilot may be included but is not necessary. The pilot may be used to ignite product gases and facilitate reactions within the chamber 100. Stabilization may occur by the pilot being continually lit. Additionally or alternatively, the central injector 114 may also deliver fuel and air to the chamber 100, as described herein. The outlet opening 112 may be configured to allow gasses and exhaust to leave the combustion chamber 100. While the axis A is shown as being generally located in the center of the chamber 100, the exhaust and/or central injector 112, 114 may be offset from the center of the chamber 100.

The outlet end 102 may define a plurality of first holes, hereinafter referred to as air holes 120. These air holes 120 may be configured to deliver air to the inside of the combustion chamber 100 and facilitate the bulk fluid motion within the chamber 100. The inlet end 104 may define a plurality of second holes, hereinafter referred to as fuel holes 122. These fuel holes 122 may be configured to deliver premixed fuel to the inside of the combustion chamber 100. The air holes 120 may be considered 'reverse' inlets because they oppose the general direction of the flow of exhaust through a central flow. The air flow from the air holes 120 may provide the bulk fluid motion. The air holes 120 may be frusto-conical or pyramid-like. The holes 120 may have an outer diameter and an inner diameter smaller than the outer diameter. Air may flow into the holes 120 at an outer diameter and into the chamber 100 at the inner diameter. These frusto-conical and/or pyramid like holes 120 may allow air to enter the chamber 100 at a higher momentum than if the holes 120 were in a cylindrical shape. Additionally or alternatively, the inner diameter of the air holes 120 may be larger than a diameter of the fuel holes 122. That is, more air may enter the chamber 100 than fuel. Additionally, air may enter the chamber 100 at a higher momentum than the fuel. The number of air holes 120 may exceed the number of fuel holes 122 allowing more air than fuel to enter the combustion chamber 100. Further, it may not be necessary for the number of air holes 122 to exceed that of the fuel holes 122 so long as more air is received at the outlet end 102. In a lean system, as described herein, the air flow may have a much larger volume than the fuel flow.

The fuel and air introduced at the inlet opening 110 may facilitate combustion within the chamber 100. This flow of fuel and air may also facilitate product gases flow from the inlet opening 110 to the outlet opening 112. This is referred to hereinafter as central flow. This central flow may allow product gases to leave the chamber 100 through the outlet opening 112. The air flow from the air holes 120 may have a greater flow than the center flow. This may cause portions of the product gases of the center flow to be pushed back towards the inlet end 104 and allow at least a portion of product gases to be maintained within the chamber 100. This is described in greater detail with respect to FIG. 6. Moreover, the fuel flow from the fuel holes 122, in combination with the downward airflow from the air holes 120, may create a vortex of product gases within the chamber 100.

Figure 3:
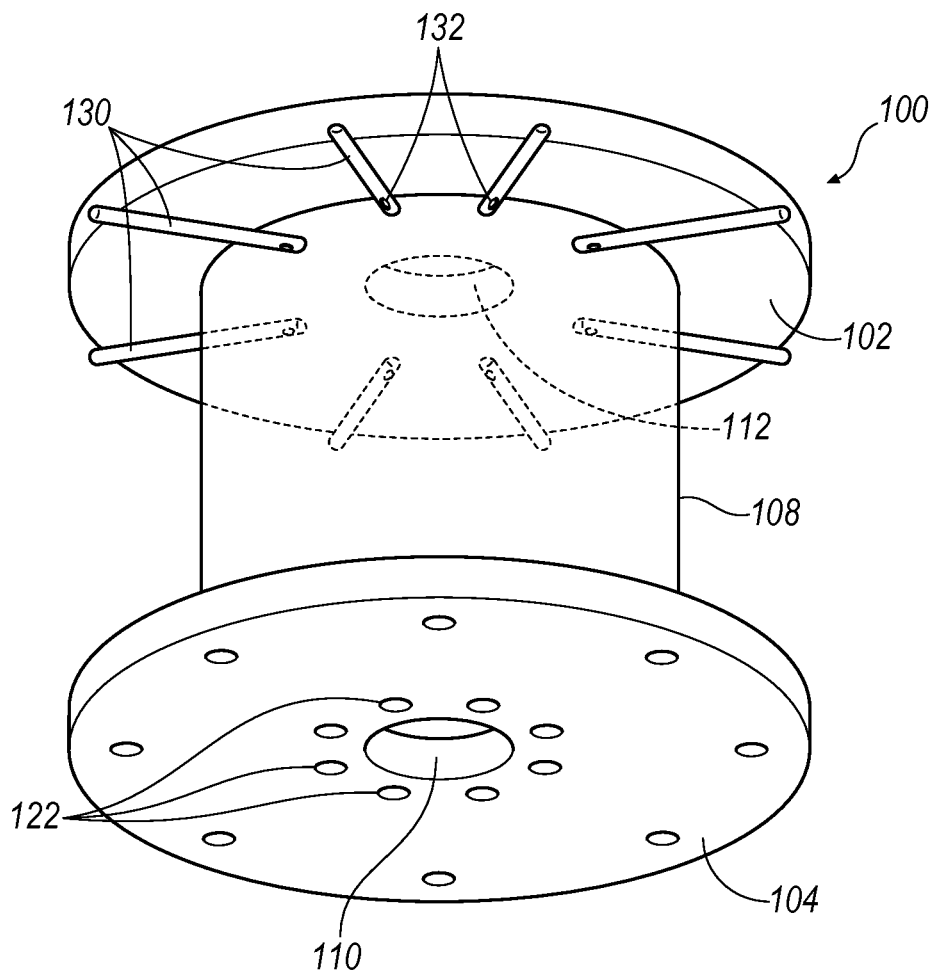
FIG. 3 illustrates a perspective view of another exemplary combustion chamber.
Figure 5:
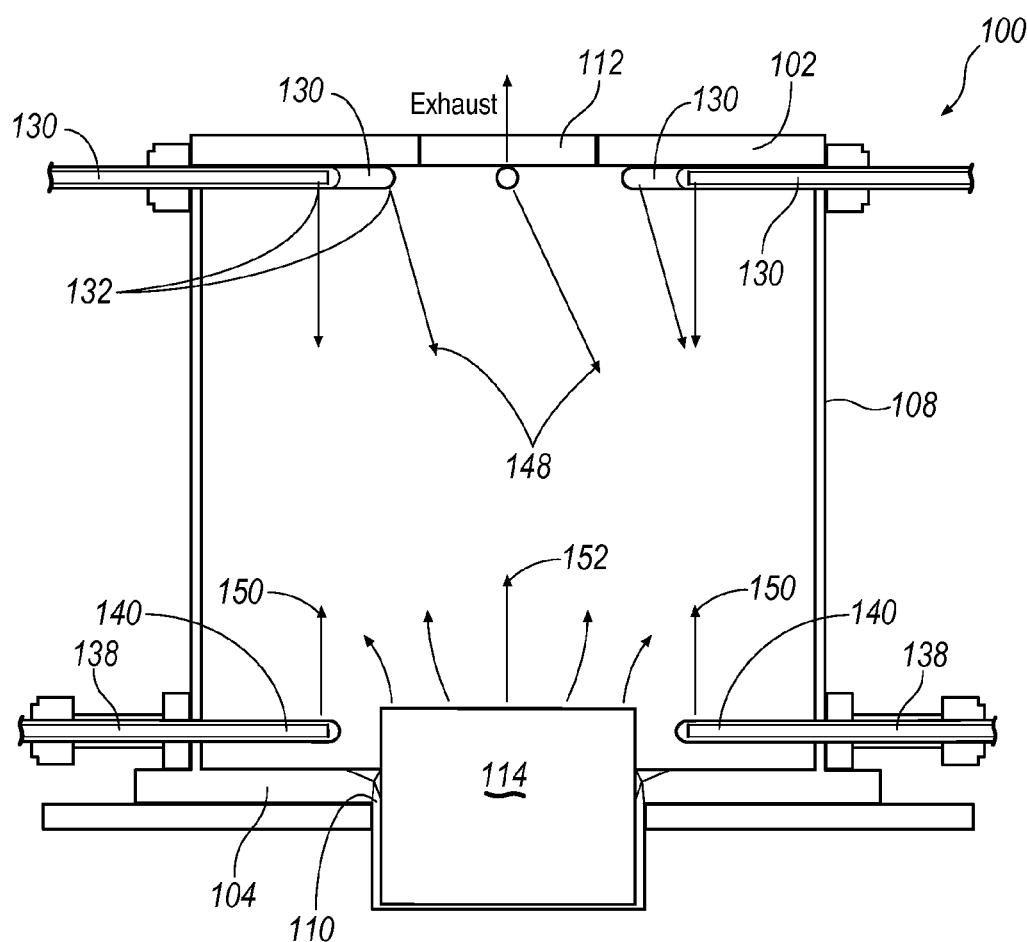
FIG. 5 illustrates an exemplary cross-sectional view of the exemplary combustion chamber.

FIGS. 3 and 5 illustrate another exemplary combustion chamber 100. In this exemplary configuration, a plurality of inlet ports 130 extend radially inwardly towards the outlet opening 112. The inlet ports 130 may form an air passage configured to deliver air from outside of the chamber 100 to the interior of the chamber 100 at the outlet end 102. Each inlet port 130 may define at least one inlet port hole 132. These holes 132 may be similar to the air holes 120 described above. The inlet port holes 132 may deliver air at the outlet end 102 of the chamber 100 to facilitate a vortex 118 (see FIG. 4) proximal to the inlet end 104 with azimuthal rotation and swirl. The inlet port holes 132 may have a frusto-conical shape, as explained above with regard to the air holes 120.

FIG. 4 illustrates a perspective view of the exemplary combustion chamber 100 in operation. While the chamber 100 is shown to be cylindrical, any shape having a central axis A may be implemented. The chamber 100, while shown as symmetrical about the axis A, may not necessarily be symmetrical. A vortex 118 is formed within the chamber 100. The vortex 118 may be formed, at least in part, by the air flow 148 from the air holes 120 and the fuel flow 150 (see FIG. 5) from the fuel holes 122. This is explained in more detail below with respect to FIGS. 6 and 7. The vortex 118 may be proximal to the inlet end 104 and may maintain at least a portion of the product gases within the chamber 100 by creating recirculation flow and a bulk swirl within the chamber 100. In one example, air flow may 148 be received from the outlet end 102 at a first momentum. The fuel may be received at the inlet end 104 at a second momentum. The air flow may be at a greater momentum than that of the fuel flow. The air flow 148 may also be at a greater momentum that that of the central flow from the central injector 114. Thus, the air flow 148 may oppose the central flow 152 (see FIG. 5) and fluid flow 150, forcing at least a portion of the product gases back towards the inlet end 104 to create a vortex 118 of product gases and be recirculated within the chamber 100. A portion of exhaust may leave the chamber 100 at the outlet opening 112.

FIG. 5 illustrates an exemplary cross-sectional view of the exemplary combustion chamber 100. In this example, inlet ports 130 deliver air to the chamber 110. Additionally, a plurality of fuel ports 138 deliver fuel at the inlet end 104 to the chamber. The fuel ports 138 are shown as fuel passages entering the wall 108 proximal to the inlet end 104. Exemplary fuel flows 150 are also shown. While the fuel flow 150 is shown as parallel to the wall 108, other exemplary fuel flows may be implemented. For example, the fuel may flow offset from the wall 108. Additionally or alternatively, fuel may flow parallel to the inlet end 104. Exemplary air flows 148 are also shown. In this example, the air flow 148 may angle such that the end or the tip of the air flow may be offset from the beginning of the air flow at the air holes 120. That is, air may not flow parallel to the central flow, but instead may be offset by a certain degree. In the example shown, each of the air flows 148 may form an azimuth-like air flow. In one example, each of the inlet port holes 132 may be angled at the same offset to form a continuous azimuthal flow throughout the chamber. In other example, the inlet port holes 132 may be angled by differing degrees. By angling the air flow 148, a swirling flow within the chamber 100 may be facilitated.

Although the above example refers to the inlet ports 130, the same offsets may be achieved by defining the air holes 120 in the outlet end 102 as described with respect to FIGS. 2 and 4.

The swirling flow may also be further facilitated by the central injector 114. The central injector 114 may deliver the pilot to the chamber, as well as at least one of fuel and air.

Figure 6:
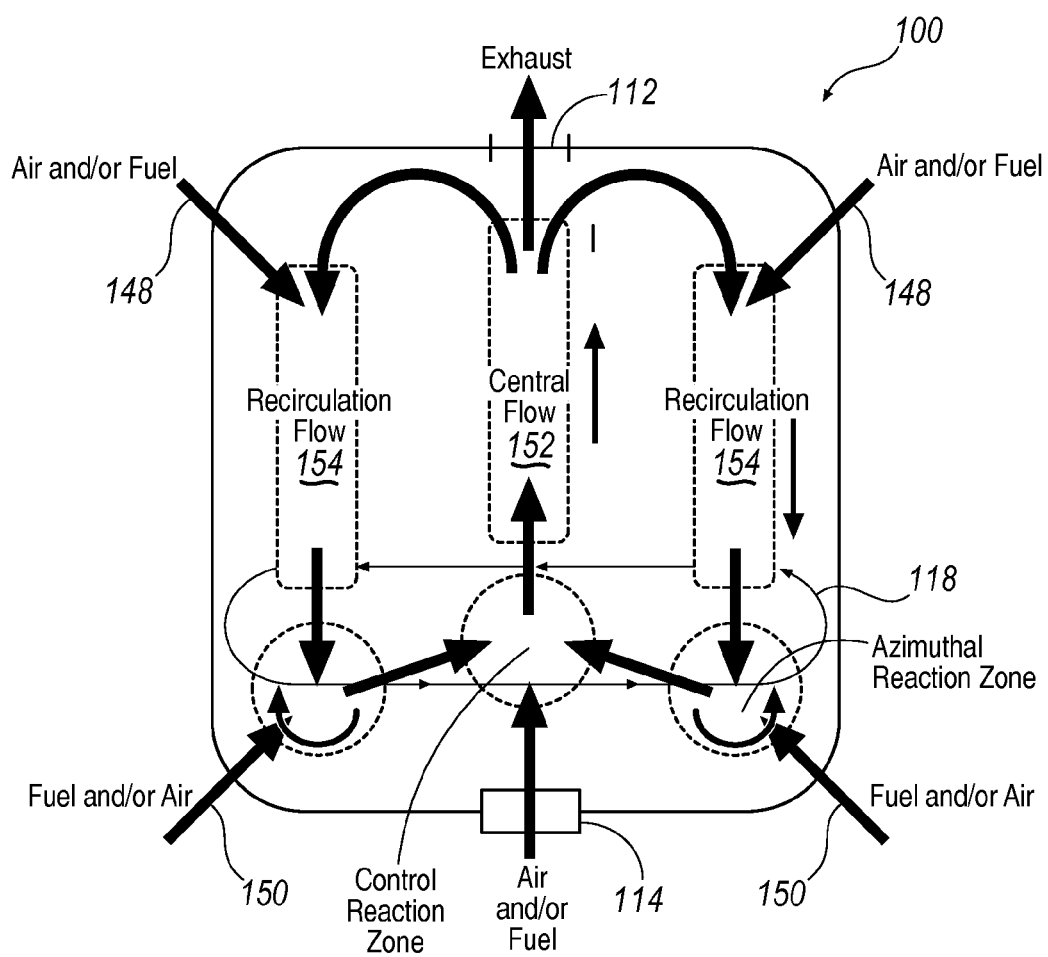
FIG. 6 illustrates an exemplary fluid flow diagram of the combustion chamber.

This may create the central flow 152, which may in part be recycled into a recirculating flow (shown in FIG. 6.)

FIG. 6 illustrates an exemplary fluid flow diagram of the combustion chamber 100. As explained above, the air holes 120/inlet port holes 132 and fuel holes 122/fuel port holes 140 (see FIG. 5) may be configured to create air flow 148 and fuel flow 150, respectively. Additionally, a central injector passing air and/or fuel 114 at an inlet opening 110 may be configured to create a central flow 152. Portions of the central flow 152 may exit the chamber 100 at the outlet opening 112. However, the remaining portion of the central flow 152 may be deflected by the air flow 148 to create the recirculation flow 154. The recirculation flow 154 may include both air and fuel and flow from the outlet end 102 towards the inlet end 104 where it may rejoin the vortex 118 of product gases.

Figure 7:
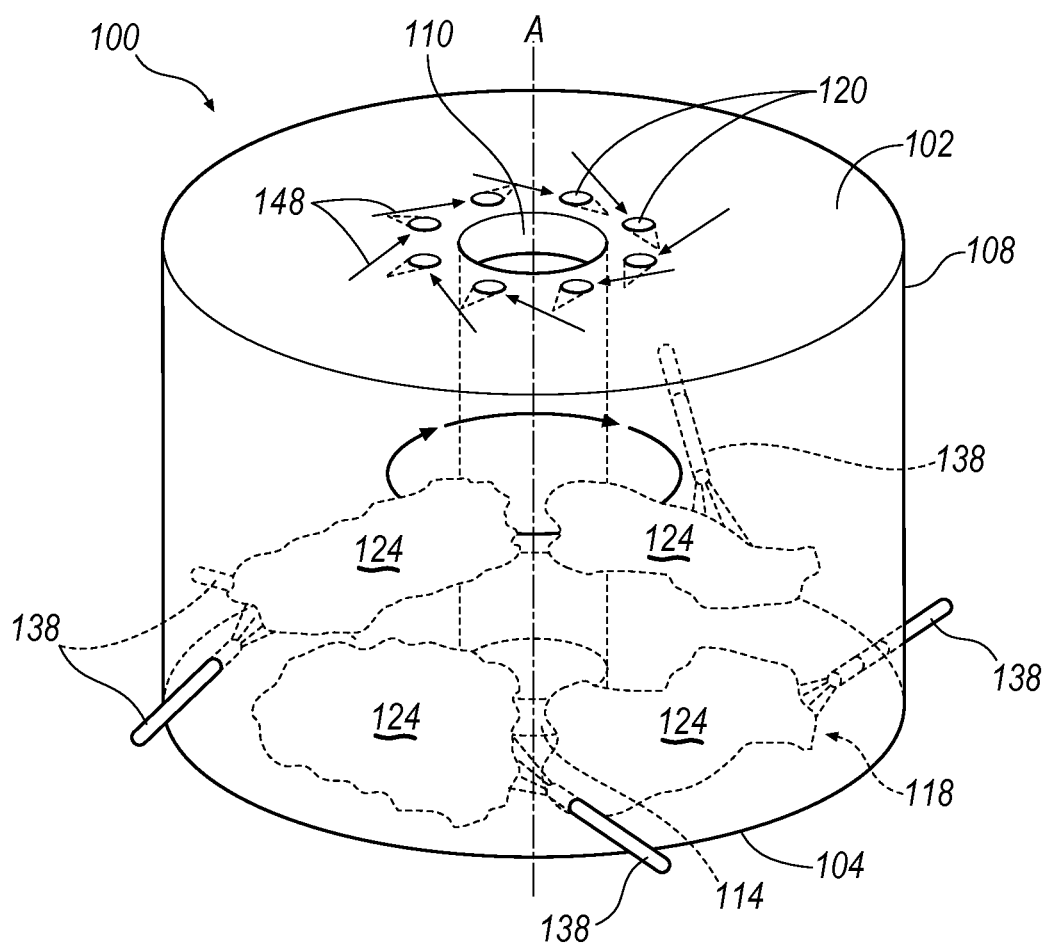
FIG. 7 illustrates a combustion chamber showing fluid flow paths.

FIG. 7 illustrates a perspective view of the exemplary combustion chamber 100 in operation when the fuel is delivered via equally spaced fuel ports 138. The fuel ports 138 may be configured as azimuthal jets configured to concurrently deliver reactant, e.g., fuel, to the chamber 100. The fuel ports 138 may be equally spaced around the chamber 100. Each fuel port 138 may be configured to supply fuel to a region of the chamber 100. Each region may be configured to supply at least a portion of product gases to the next region, thus creating a continuous supply of product gases 124 for the reaction at each fuel port 138. Additionally, this vortex 118 may include a bulk swirl of product gases and reactant configured to partially recirculate the product gases within the chamber 100, forcing them to return towards the inlet end 104.

While the fuel flow may be introduced normal to the wall 108, as shown in FIG. 5. The fuel flow may also be at an angle, as shown in FIG. 7. As explained, the fuel (reactant) may penetrate the vortex 118 created by the reverse flowing air jets to facilitate the creation of the azimuthal toroid flow of product gases 124. Once combustion has initiated due to the pilot and the product gases, each fuel jet/port 138 will enter in proximity to the product gases 124 of the preceding reaction. Any number of fuel ports 138 may be used. With proper circulation, only one port 138 may be necessary. Additionally, three ports 138 may be contemplated and anywhere between approximately 4-12 ports 138 may arranged around the combustion chamber 100.

The fuel flow 150 may be introduced through the fuel ports 138 (or fuel holes 122) with sufficient momentum to carry the fuel into the toriodal azimuthal vortex before ignition occurs. Additionally or alternatively, the air flow 148 may provide sufficient momentum to carry the fuel flow in a swirl and enhance mixing with the hot combustion gasses until ignition occurs. This may be facilitated by angled air holes 120 that provide a bulk swirl to the vortex 118.

Although the disclosure focusses on combustion chambers, the described fluid flows may be applied to any reaction process that could benefit through product recirculation and/or reactant dilution in a limited volume example. Through the above apparatus and methods, sufficient dilution, mixing, and energy are achieved in addition to a stable highly-dilute combustion regime in the bulk of the combustion chamber by creating the azimuthal stabilization of the reaction.

By creating this vortex of product proximal to the inlet end, extremely high homogeneity of product composition and temperature is maintained throughout the chamber. Peak flame temperatures are also reduced and therefore minimize the thermal load on the walls and injector of the combustion chamber. Additionally, very low CO, NOx and UHC (unburned hydrocarbon) emissions are achieved. Further, the above system may operate with complete absence of the pilot flame. It may be used in a wide range of operations and has good fuel flexibility due to longer residence times and high rates of mixing.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A combustor comprising:
   a first surface and a second surface, parallel to the first surface, interconnected by a wall forming a chamber configured for combustion;
   the first surface defining a plurality of first openings, each first opening of the plurality of first openings comprising a frustoconical shape having an outer diameter and an inner diameter smaller than the outer diameter, and wherein at least one of air and fuel flow is configured to pass from the outer diameter through the inner diameter into the chamber; and
   the second surface defining a plurality of second openings configured to receive fuel, wherein air flow from the plurality of first openings and fuel from the plurality of second openings are injected in substantially opposite directions to create a vortex of product proximal to the second surface;
   wherein the chamber has a central axis, the first surface defining an exhaust opening configured to exhaust product from the chamber and the second surface defining an inlet opening configured to supply at least one of fuel and air to the chamber, wherein the exhaust opening and the inlet opening align along the central axis of the chamber and wherein at least one of the plurality of first openings and the plurality of second openings are arranged about the central axis.

2. The combustor of claim 1, wherein the inner diameter of each first opening of the plurality of first openings is larger than a diameter of each second opening of the plurality of second openings.

3. The combustor of claim 1, wherein the plurality of first openings are offset from the wall.

4. The combustor of claim 3, wherein each of the plurality of first openings are equally offset from the wall.

5. The combustor of claim 1, wherein the inlet opening is configured to support the creation of the vortex of product.

6. The combustor of claim 5, further comprising a pilot at the inlet opening.

7. The combustor of claim 1, wherein a number of the plurality of first openings is greater than a number of the plurality of second openings.

8. The combustor of claim 1, wherein fuel flow from each of the plurality of second openings is configured to react with at least a portion of the product within the vortex.

9. A method of creating the vortex within the chamber of the combustor of claim 1, comprising:

receiving air flow through the plurality of first openings and into the chamber at a first momentum, wherein the air flow is at an angle relative to the first surface; and receiving fuel flow through the plurality of second openings and into the chamber at a second momentum, wherein the first momentum is greater than the second momentum to create the vortex of product proximal to the second surface.

10. The method of claim 9, further comprising: receiving a central flow including the at least one of fuel and air at a central injector positioned in the inlet opening of the second surface, wherein the central flow is injected in a substantially opposite direction from the air flow received through the plurality of first openings and into the chamber.

11. The method of claim 10, wherein a portion of the central flow leaves the chamber at the exhaust opening defined in the first surface.

12. The method of 11, wherein only the air flow is received through the plurality of first openings and wherein the air flow through the plurality of first openings is configured to collide with the central flow and direct a remaining portion of the central flow towards the second surface creating a recirculation flow.

13. A combustor, comprising:
a first surface and a second surface interconnected by a wall forming a chamber configured for combustion;
a plurality of inlet ports arranged in an interior of the chamber along the first surface, wherein each inlet port of the plurality of inlet ports includes an inlet port hole having an outer diameter and an inner diameter smaller than the outer diameter, and wherein at least one of air and fuel flow is configured to pass from the outer diameter through the inner diameter into the chamber; and
a plurality of fuel ports arranged in the interior of the chamber along the second surface and configured to receive fuel, wherein each fuel port of the plurality of fuel ports includes a fuel port hole configured to deliver fuel into the chamber, wherein air from the inlet ports and fuel from the fuel ports are injected in substantially opposing directions to create a vortex of product proximal to the second surface;
wherein the chamber has a central axis, the first surface defining an exhaust opening configured to exhaust product from the chamber and the second surface defining a pilot opening, wherein the exhaust opening and the pilot opening align along the central axis of the chamber;
wherein each inlet port of the plurality of inlet ports extends radially inwardly, with respect to the central axis, from outside of the chamber to the interior of the chamber towards the exhaust opening;
wherein each fuel port of the plurality of fuel ports extends radially inwardly, with respect to the central axis, from an edge of the second surface outside of the chamber to the interior of the chamber to deliver fuel to the chamber.

14. The combustor of claim 13, wherein momentum of the air from the plurality of inlet port holes into the chamber is greater than momentum of the fuel from the plurality of fuel port holes into the chamber.

15. The combustor of claim 13, wherein each inlet port of the plurality of inlet ports defines the inlet port hole at an end of the inlet port to deliver air to the chamber.

16. The combustor of claim 15, wherein each inlet port hole of the plurality of inlet ports is angled at a same offset angle relative to the wall to form a continuous azimuthal air flow through the chamber.

17. The combustor of claim 13, wherein a number of the plurality of inlet ports is greater than a number of the plurality of fuel ports.

18. The combustor of claim 13, wherein the plurality of fuel ports are arranged such that fuel flow from a first fuel port is configured to react with combined air and fuel from an adjacent fuel port.

19. The combustor of claim 13, wherein the pilot opening is configured to deliver at least one of fuel and air into the chamber to create a central flow, wherein a portion of the central flow exits the chamber at the exhaust opening and a remaining portion of the central flow is abutted by the air from the plurality of inlet ports to create a recirculation flow surrounding the central flow.

* * * * *